UNITED STATES PATENT OFFICE.

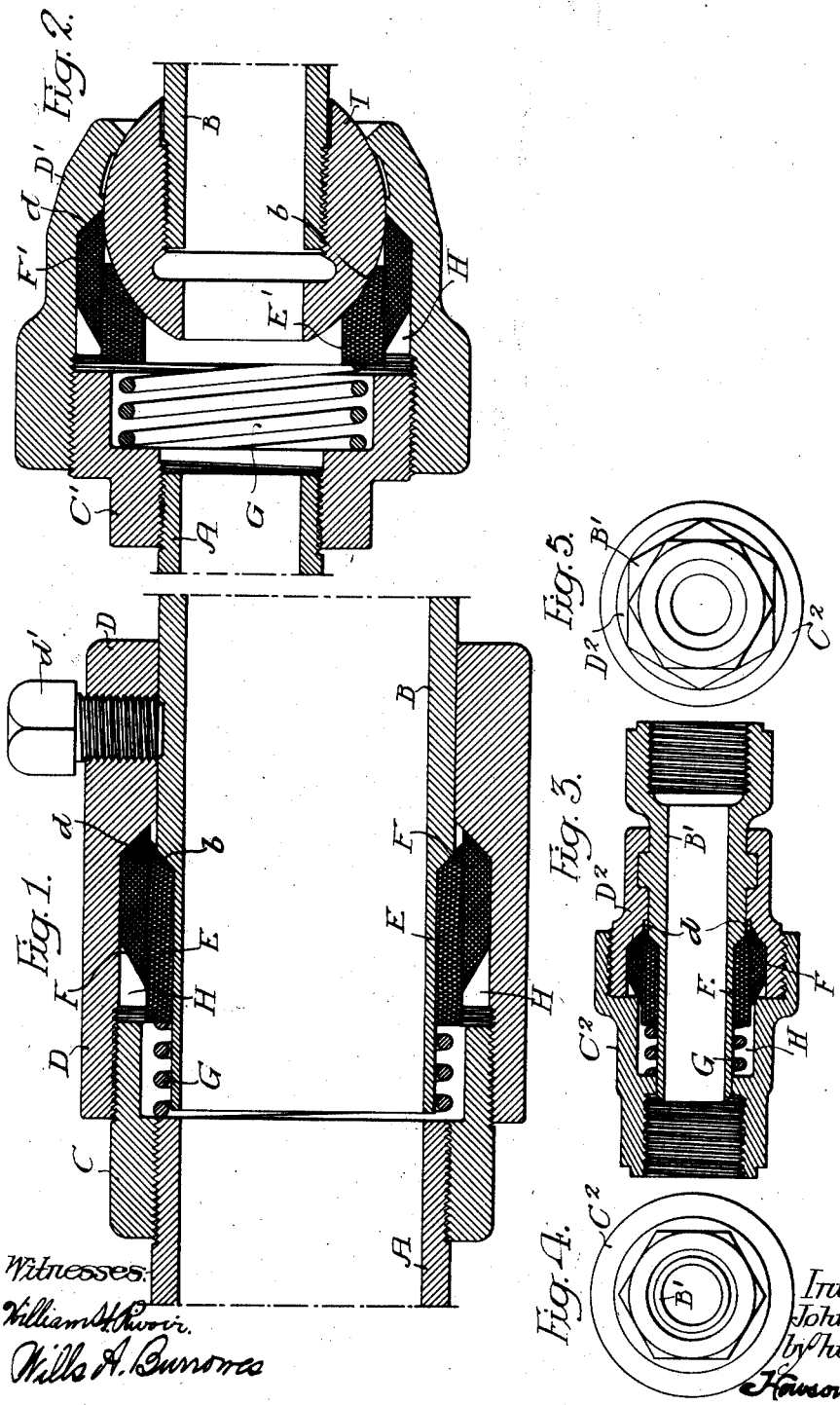

JOHN M. CAMERON, OF CRANBERRY, NORTH CAROLINA.

PIPE-COUPLING.

No. 927,403.  Specification of Letters Patent.  Patented July 6, 1909.

Application filed July 15, 1908. Serial No. 443,676.

*To all whom it may concern:*

Be it known that I, JOHN M. CAMERON, a citizen of the United States, residing in Cranberry, North Carolina, have invented certain Improvements in Pipe-Couplings, of which the following is a specification.

One object of my invention is to provide a coupling for pipes, tubes, hose, and the like, which shall consist of but few parts and be of such a construction as will permit of said parts being quickly put together or disconnected; it being further desired that the device shall be of such a nature as to remain free from leaks regardless of whether it is employed for liquids or gases under pressure. I also desire to provide a coupling which will permit the pipes to which it is connected to be extended at various angles to each other without requiring them to be bent. These and other advantageous ends I secure as hereinafter set forth, reference being had to the accompanying drawings, in which:—

Figure 1, is a vertical section illustrating my improved coupling; Fig. 2, is a vertical section illustrating a special form of the coupling particularly adapted for use when it is desired that the two lengths of pipe to be connected shall extend at an angle to each other; Fig. 3, is a vertical section, illustrating my improved coupling as adapted for use with a common form of hose connection; Figs. 4 and 5, are respectively end elevations of the coupling shown in Fig. 3.

In Fig. 1, of the above drawings, A and B represent respectively the two adjacent ends of lengths of pipe to be coupled, the first of these being threaded for the reception of a reducing bushing C. The second pipe section B has at or adjacent to one end a portion of reduced external diameter and has fixed to it, in the present instance by means of a set screw $d'$, a cylindrical sleeve D, a portion of whose interior is of greater diameter than the remainder, which fits on the pipe section B. The shoulders connecting the parts of different diameters, both of the pipe section B and of the sleeve D, are inclined or beveled at angles of about 45° as indicated at $b$ and $d$, and the end of said sleeve D adjacent to the reducing bushing C, is interiorly threaded for the reception of the threaded portion of said bushing. It will be noted that the end of the pipe section B extends immediately adjacent to the end of the section A so that there is formed within the sleeve D, outside the pipe sections, an annular recess or chamber in which are mounted two packing rings E and F and a spring G; the latter extending between one end of the ring E and the adjacent face of the reducing bushing C or pipe section A. The spring G surrounds the reduced end of the pipe section B and continually tends to press the packing ring E into engagement with the beveled shoulder $b$ of said section, the end of said packing ring being formed on a bevel corresponding to that of the shoulder. The packing ring F, which fits outside of the ring E within the recess, is beveled at both ends, and one of these beveled portions coöperates with and engages the shoulder $d$ of the sleeve D.

Under conditions of use, fluid under pressure from the pipe system enters the recess H formed by the sleeve D and the reducing bushing C and not only acts to force both packing rings E and F against the two shoulders $b$ and $d$, but also, by pressing upon the free beveled end of the ring F forces this into intimate contact with the packing ring E. Moreover, the action of the spring G is such that the packing ring E is forced toward the shoulder $b$, and being free to slide thereon to a limited extent, is also forced against the inside surface of the packing ring F. There is thus formed a fluid tight joint between the two pipe sections, or rather between the pipe section B and the sleeve D, since the threaded joints between the reducing bushing C and the pipe section A and the sleeve D are necessarily made fluid tight.

Owing to the fact that the ends of the two pipe sections extend into close proximity with each other, there is little or no opportunity for sand or other foreign bodies getting into the chamber H so as to cut or injuriously act upon the packing rings. These latter are preferably made of rubber or other resilient or soft material, and it is possible that in some instances soft metal or other equivalent material may be employed.

In the form of my invention illustrated in Fig. 2, I thread the end of the pipe section B and screw thereon a spherical head I, in such case curving the interior portion of the coupling sleeve D' so that it fits said head. Although the reducing bushing C' and the packing ring E' and F' have their shapes altered to suit this ball and socket connection, their functions are practically the same as described in connection with Fig. 1.

In Fig. 3, I have shown my invention as particularly designed for use in a coupling employed for connecting sections of air hose, and in this instance the sleeve D² has threads upon its exterior for the reception of the interior threads of a bushing C². The coupling as a whole is so designed that its parts may be quickly connected or disconnected.

While I preferably employ the spring G to hold one of the packing rings to its seat or shoulder when the device is not under pressure, it may in some instances be omitted without departing from the main features of my invention.

I claim:—

1. The combination of two pipe sections, of which one is provided with a beveled seat, a sleeve connecting said pipe sections and also having a seat, a packing ring having a beveled portion placed to coöperate with said beveled seat of the pipe section, and a second packing ring placed to coöperate with the seat on the sleeve.

2. The combination in a pipe coupling of two pipe sections, a sleeve connecting said sections, with two packing rings mounted one outside of the other and provided with seat portions respectively placed to coöperate with seats on the sleeve and on one of the pipe sections.

3. The combination in a pipe coupling of two pipe sections, of which one is provided with a beveled shoulder, a sleeve having a fluid tight connection with one of said sections and provided with an interior beveled shoulder, with two packing rings, one inside of the other, respectively engaging the beveled shoulders of the pipe section and of said sleeve.

4. The combination in a pipe coupling of two pipe sections, of which one is provided with a beveled shoulder, a sleeve having a fluid tight connection with one of said sections and provided with an interior beveled shoulder, two packing rings, one inside the other, respectively engaging the beveled shoulders of the pipe section and said sleeve, and a spring acting on said packing rings.

5. The combination of two pipe sections of which one is provided with a reduced portion terminating in a beveled shoulder, a sleeve having fluid tight connection with the other of the pipe sections and having an interior beveled shoulder, with two packing rings, one inside of the other and having beveled ends respectively engaging the shoulders of the pipe section and the sleeve.

6. The combination of two pipe sections of which one is provided with a reduced portion terminating in a beveled shoulder, a sleeve having fluid tight connection with the other of the pipe sections and provided with an interior beveled shoulder, with two packing rings having beveled ends respectively engaging the shoulders of the pipe section and the sleeve, one of said packing rings having also a beveled end exposed to the action of fluid under pressure whereby it is forced into intimate engagement with the other packing ring.

In testimony whereof, I have signed my name to this specification, in the presence of two subscribing witnesses.

JOHN M. CAMERON.

Witnesses:
W. M. DUNN,
SAM OAKES.